United States Patent [19]

Nakata et al.

[11] 4,145,265

[45] Mar. 20, 1979

[54] PROCESS FOR CONCENTRATION OF CAUSTIC ALKALI SOLUTION PRODUCED BY ION EXCHANGE MEMBRANE TYPE ELECTROLYSIS

[75] Inventors: Jyoichi Nakata, Tokyo; Yasumasa Chiba, Ichikawa; Tetsuhiko Seto; Yoshinori Fukuhara, both of Kure, all of Japan

[73] Assignees: Asahi Glass Company, Ltd.; Ishikawajima-Harima Jukogyo Kabushiki Kaisha, both of Tokyo, Japan

[21] Appl. No.: 881,387

[22] Filed: Feb. 27, 1978

[30] Foreign Application Priority Data

Mar. 15, 1977 [JP] Japan .................................. 52-28388

[51] Int. Cl.$^2$ ........................... C25B 1/16; C25B 1/26
[52] U.S. Cl. ...................................... 204/98; 104/128
[58] Field of Search .................................. 204/98, 128

[56] References Cited

U.S. PATENT DOCUMENTS

| | | | |
|---|---|---|---|
| 3,986,951 | 10/1976 | Fremont | 204/98 |
| 4,057,474 | 11/1977 | Kurtz et al. | 204/98 |

Primary Examiner—R. L. Andrews
Attorney, Agent, or Firm—Oblon, Fisher, Spivak, McClelland & Maier

[57] ABSTRACT

In the electrolysis of an alkali metal chloride in an ion exchange membrane type electrolysis cell the dilute caustic alkali solution produced in the cathode compartment is concentrated in a series of heating and evaporating operations wherein it is heated by heat exchange with the hot dilute metal chloride solution removed from the anode compartment. The caustic alkali solution and metal chloride solutions flow countercurrently through the heat exchange steps of the concentrating operations.

10 Claims, 1 Drawing Figure

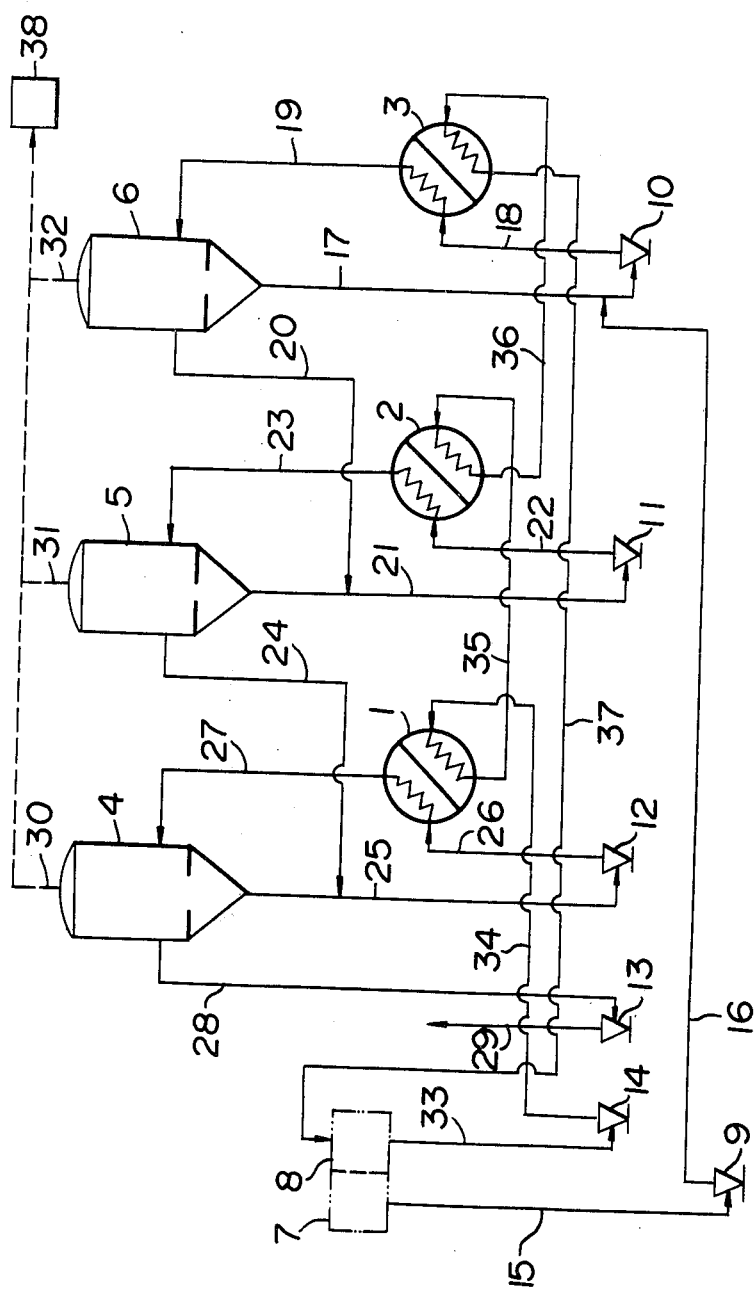
FIG. I

PROCESS FOR CONCENTRATION OF CAUSTIC ALKALI SOLUTION PRODUCED BY ION EXCHANGE MEMBRANE TYPE ELECTROLYSIS

BACKGROUND OF THE INVENTION

1. Field of the Invention

The present invention relates to a process for concentrating a caustic alkali solution produced by an ion exchange membrane type electrolysis of an alkali metal chloride solution by effectively utilizing the heat generated by the electrolysis without special heating means.

2. Description of Prior Arts

There are two kinds of processes for producing a caustic alkali on an industrial scale, i.e. the mercury electrolysis process and the diaphragm process using an asbestos diaphragm.

The former process has the disadvantage causing pollution by mercury and the latter process has the disadvantage that the caustic containing an alkali chloride as an impurity which reduces quality.

A third process, which has been employed on an industrial scale is to electrolyze an alkali metal chloride solution in an electrolytic cell having an anode compartment with an anode and a cathode compartment with a cathode which are separated by an ion exchange membrane (ion exchange membrane type electrolysis).

In accordance with the ion exchange membrane type electrolysis, a caustic alkali solution having high purity and relatively high concentration can be obtained. However, when high concentration such as 45 to 50 wt.% of NaOH is required, it is necessary to concentrate the caustic alkali solution by some method.

Since the concentration of the caustic alkali solution obtained by the diaphragm process is low, about 10 to 13 wt.%, the solution has been concentrated. In the concentration, steam has been used as a heat source.

The anolyte has relatively high electric resistance in comparison with that of the caustic alkali solution whereby the leakage of current caused by discharging the anolyte from the electrolytic cell is small and the lowering of current efficiency caused by the leakage of current can be minimum. Moreover, corrosion of the material of the electrolytic cell caused by the leakage of current can be minimum. The concentration has been carried out by using a multiple effect evaporator.

The concentration of the caustic alkali solution obtained by the ion exchange membrane type electrolysis can be also attained by the same process used in the diaphragm process. In this process, steam generated from a boiler is used as a heat source whereby the process is complicated and uneconomical.

The inventors have considered how to attain the concentration of the caustic alkali solution by utilizing the heat of the dilute alkali metal chloride solution as the heat source without an additional steam heating means. The heat is generated by the electric resistance of the electrolyte and the ion exchange membrane in the ion exchange membrane type electrolysis heats the electrolyte to about 80° to 120° C. and is retained in the caustic alkali solution obtained from the catholyte compartment and the dilute alkali metal chloride solution obtained from the anode compartment. The temperature of the alkali metal chloride solution is higher than that of the caustic alkali solution since the electric resistance of the alkali metal chloride solution is higher.

SUMMARY OF THE INVENTION

It is an object of the present invention to provide a process for conentration of a caustic alkali solution by utilizing the sensible heat of the dilute alkali metal chloride solution (anolyte) obtained from the anode compartment as a heat source for the concentration of the caustic alkali solution obtained from the cathode compartment of the ion exchange membrane type electrolytic cell.

It is another object of the present invention to provide a process for concentration of a caustic alkali solution by effectively utilizing the sensible heat of an anolyte at a relatively low temperature such as 80° to 120° C. by means of heat exchange between the caustic alkali solution and the anolyte by a special process.

Another object of the present invention is to provide a process for concentration of a caustic alkali solution by using the anolyte as a heat source without adversely affecting the ion exchange membrane electrolysis while lowering leakage of current caused by discharging the anolyte.

BRIEF DESCRIPTION OF THE DRAWINGS

FIG. 1 is a flow sheet of one embodiment of an apparatus used in the process of the present invention which comprises three unit concentration processes in series.

DETAILED DESCRIPTION OF THE PREFERRED EMBODIMENT

In the process of the present invention, the caustic alkali solution obtained from the electrolytic cell in the ion exchange membrane type electrolysis of the alkali metal chloride solution, is concentrated in a process having a plurality of serial unit concentration processes each of which comprises a heat exchange step between the caustic alkali solution and the anolyte (the alkali metal chloride solution having electrolytic heat obtained from the anode compartment) and a vapor-liquid separation step for evaporating the caustic alkali solution after the heat exchange.

The caustic alkali solution is fed to the first unit concentration process unit to increase the concentration of the caustic alkali solution and then, it is subsequently fed to the following concentration process unit to obtain the concentrated caustic alkali solution from the final concentration process unit while the anolyte is fed to the final concentration process unit and then, it is subsequently fed toward the earlier concentration process units. The anolyte discharged from the first concentration process unit is admixed with the raw material salt to prepare a saturated or substantially saturated alkali metal salt solution and is recycled to the anode compartment.

The anolyte flows counter-currently to the caustic alkali solution through the plurality of concentration processes units whereby the heat exchange is performed to concentrate the caustic alkali solution.

The boiling point of the caustic alkali solution is lowered at lower concentrations. This face is used to attain the evaporations of the caustic alkali solution in each of the concentration units by feeding the caustic alkali solution having low concentration to the first concentration unit at relatively low temperature to evaporate it. The concentrated caustic alkali solution is consequently fed to the concentration units having higher temperatures in series even though the temperature of the anolyte which serves as the heating medium is not very high.

In the process of the present invention, it is necessary to carry out the individual concentration steps at a reduced pressure so as to decrease the boiling point of the caustic alkali solution. The degree of reduction pressure is preferably greater depending upon the temperature of the anolyte which serves as the heat medium, and it is especially preferable in a range of 60 to 90 mmHg (ab.). It is preferable to keep all of the concentration processes units at the same reduced pressure.

It is preferable to recycle a part of the concentrated caustic alkali solution obtained by the vapor-liquid separation in the vapor-liquid separation step of the concentration unit to the heat exchange step of the same concentration unit in order to improve the concentration of the caustic alkali solution. That is, it is preferable to include a recycling step in the unit concentration process.

The desirable result of the present invention can be attained by providing a plurality of concentration processes units in series especially 3 to 5 units from the economical viewpoint.

The apparatus for the unit concentration process comprises an evaporator and a heat exchanger. The evaporator can be a flash evaporator. The material of the evaporator can be made of an alkali resistant metal such as iron, iron alloys (Fe-Cr alloy, Fe-Cr-N alloy, etc.), nickel and nickel alloys (Ni-Cu alloy, Ni-Fe alloy, Ni-Cr alloy etc.). When the concentration of the caustic alkali solution contacted with the evaporator is in a range of 40 to 50 wt.% as NaOH, it is preferable to use nickel or a nickel alloy, especially nickel. When the concentration of the caustic alkali solution is lower, it is preferable to use stainless steels such as Fe-Cr alloys and Fe-Cr-Ni alloys since they are more economical though nickel and nickel alloy can be used. That is, it is possible to use nickel or nickel alloy for the material of all of the evaporators in the plurality of the unit concentration processes however, it is preferable to use stainless steel for the evaporators used for the low concentration caustic alkali solution. It is preferable to use a heat exchanger having composite heat exchange partitions made of titanium and an alkali resistant metal. The anolyte is fed to the titanium side of the heat exchanger and the caustic alkali solution is fed to the alkali resistant metal side, whereby the corrosion of the heat exchange partitions can be prevented and the life can be prolonged. As the alkali resistant metal, iron, iron alloys, nickel and nickel alloys can be used. When the concentration of the caustic alkali solution is more than about 40 wt.%, it is preferable to use nickel or a nickel alloy as the alkali resistant metal.

The titanium-alkali resistant metal composite partition is preferably bonded with a titanium-alkali resistant metal alloy layer, whereby peeling-off of titanium plate from the alkali resistant metal plate can be prevented and the decreased heat conductivity and mechanical strength can be avoided.

When nickel is used as the alkali resistant metal in the composite partitions bonded with a titanium-alkali resistant metal layer, the thickness of the nickel layer is preferably more than $1\mu$ especially more than $10\mu$ and the thickness of the titanium layer is preferably more than $10\mu$ especially more than $100\mu$ from the viewpoint of anticorrosive characteristic. The thickness of the titanium-nickel alloy layer is preferably 1 to $10\mu$ especially 3 to $8\mu$ from the viewpoint of mechanical strength.

When iron is used as the alkali resistant metal, the thickness is preferably more than $2\mu$ especially more than $15\mu$ from the viewpoint of anticorrosive characteristics. The thickness of the titanium is preferably more than $10\mu$ especially more than $100\ \mu$ and the thickness of the iron-titanium alloy is preferably 2 to $12\mu$ from the viewpoint of mechanical strength.

In order to prepare the titanium-alkali resistant metal composite partition, it is possible to employ the explosion bonding method of bonding the two kinds of metals under an explosion of an explosive material or the hot diffusion bonding method of heating two kinds of metals which are compressed under a reduced pressure. Thus, it is preferable to bond titanium and the alkali resistant metal by heat treatment from the viewpoints of easy formation of the alloy layer having desirable thickness and the below-mentioned processability. The bonding can be attained by mechanically contacting the titanium substrate with the alkali resistant metal substrate. Thus, it is preferable to bond them after coating the alkali resistant metal on the titanium substrate or coating titanium on the alkali resistant metal substrate.

The process of the present invention will be further illustrated by a preferred embodiment for preparing the titanium-nickel composite partition. Nickel is coated on the titanium substrate to a thickness of more than $4\mu$ preferably more than $5\mu$ by means of electroplating, chemical plating, or vapor metallizing, and the coated substrate is heated to a temperature higher than 450° C. preferably higher than 600° C. especially 750° C. in a non-oxidizing atmosphere, whereby a suitable result is attained.

It is also possible to coat titanium on the nickel substrate and to heat it in a non-oxidizing atmosphere, however it is not easy to form a uniform titanium coating layer. Accordingly, it is preferable to prepare it by the method of coating nickel on the titanium substrate. The reason why the heat treatment is performed in a non-oxidizing atmosphere is to prevent the oxidation of titanium and nickel from deteriorating the bonding of titanium and nickel by reason of the oxidized surface. The non-oxidizing atmosphere can be attained by providing reduced pressure, an inert gas atmosphere or a reduction reducing atmosphere. In order to prepare the titanium-iron composite partitions, it is preferable to heat them at higher than 600° C. These methods are advantageous for preparing the titanium-nickel composite heat transfer partitions having complicated shapes.

Referring to FIG. 1, the process of the present invention will be illustrated. FIG. 1 is a flow sheet of one embodiment of the apparatus used in the process of the present invention, wherein three concentration units are connected in series and each unit comprises a heat exchange step, a vapor-liquid separation step and a recycling step.

In FIG. 1, the aqueous solution of NaOH produced in the cathode compartment (7) of the electrolytic cell is fed to a suction pipe (17) of a No. 3 recycling pump (10) in the final third unit concentration process by a feed pump (9) for an aqueous solution of NaOH. The aqueous solution of NaOH fed into the third unit concentration process is recycled with the concentrated aqueous solution of NaOH in a No. 3 evaporator (6) by the No. 3 recycling pump (10), and it is heat-exchanged in a No. 3 heat exchanger with an anolyte fed through an outlet pipe (36) of a No. 2 heat exchanger (2) in the second unit concentration process. The heated aqueous solution of NaOH is flashed in the No. 3 evaporator (6) to produce a vapor-liquid separation. The vapor is fed through an outlet pipe (32) of the evaporator (6) into a vacuum condenser (38) wherein it is condensed and is discharged. The liquid aqueous solution of NaOH is concentrated and overflows through a pipe (20) to a suction pipe (21) of a No. 2 recycling pump (11) of the second unit concentration process. The anolyte which is heat-exchanged in the heat exchanger (3) is recycled through an outlet pipe (37) to the anode compartment (8) of the electrolytic cell. The anolyte discharged from the outlet pipe (37) has a low concentration of NaCl. Accordingly, the raw material salt is added to prepare a saturated or substantially saturated aqueous solution of NaCl (brine) before feeding it to the anode compartment (8). When components disadvantageous for electrolysis such as $Ca^{2+}$ and $Mg^{2+}$ are contained in the brine, it is preferable to separate these impurities by purifying the brine.

In the second concentration process unit, the concentrated solution fed through the pipe (20) from the evaporator (6) and the recycled concentrated solution from the evaporator (5) are heat-exchanged in a No. 2 heat-exchanger (2) with an anolyte fed through a No. 1 heat exchanger (1) in the first concentration unit. The heated concentrated solution is fed through an outlet pipe (23) into a No. 2 evaporator (5) wherein the vapor-liquid separation is performed. The separated vapor is fed through an outlet pipe (31) to a vacuum condenser (38) wherein it is condensed and is discharged. The aqueous solution of NaOH is concentrated and overflows through a pipe (24) to an suction pipe (25) of a No. 1 recycling pump (12) in the first concentration unit. On the other hand, the anolyte passed through the heat exchanger (2) is fed to the heat exchanger (3) in the third unit concentration process as mentioned above.

In the first concentration unit, the anolyte having electrolytic heat generated in the anode compartment (8) of the electrolytic cell, is sequentially passed through an anolyte pipe (33), a pump (14), an outlet pipe (34) to a No. 1 heat exchanger (1). On the other hand, the concentrated solution overflowing from the evaporator (5) in the second unit concentration process is fed through a pipe (24) to a suction pipe (25) of a recycling pump (12). The solution is fed together with the recycled concentrated solution fed from the evaporator (4) through the recycling pump (12) into the heat exchanger (1) wherein the heat exchange with the anolyte is performed. The solution is fed into the evaporator (4) wherein the vapor-liquid separation is performed. The separated vapor is fed through an outlet pipe (30) into a vacuum condenser (38) wherein it is condensed and discharged. The aqueous solution of NaOH is thus concentrated. A part is recycled to the recycling pump (12) and the remainder overflows through a suction pipe (28), a pump (13), an outlet pipe (29) for discharge. The concentration of NaOH in the discharged concentrated solution is dependent upon the concentration of the brine and the heat generated by the electrolysis and sometimes it reaches the final concentration of 45 to 50 wt.%. When it is lower than the final concentration, the concentrated solution is fed into a concentration step and heated with steam so as to concentrate it to the final concentration of 45 to 50 wt.%. In this case, the amount of steam used as the heat source can be remarkably reduced in comparison with the conventional concentration with steam. The cost can be remarkably reduced.

No. 1, No. 2, and No. 3 evaporators (4), (5), (6) are made of nickel or nickel alloy. No. 3 evaporator (6) can be made of stainless steel.

The No. 1, No. 2, No. 3 heat exchangers (1), (2), (3) each have heat exchange surfaces of the titanium-alkali resistant metal composite partition. The aqueous solution of NaOH is fed on the side of the alkali resistant metal layer and the anolyte is fed on the side of titanium layer.

The process of the present invention can be applied for the concentration of an aqueous solution of NaOH obtained by an ion exchange membrane type electrolysis of an aqueous solution of NaCl or the concentration of an aqueous solution of KOH obtained by an ion exchange membrane type electrolysis of an aqueous solution of KCl.

EXAMPLE 1

In the concentration apparatus having three unit concentration processes in series as shown in FIG. 1, the concentration of an aqueous solution of NaOH obtained by an ion exchange membrane type electrolysis of an aqueous solution of NaCl was carried out.

The aqueous solution of NaOH obtained from the cathode compartment of the electrolytic cell (the concentration of NaOH of 30 wt.%; 95° C.) was passed consecutively through the No. 3, No. 2 and No. 1 unit concentration processes and a concentrated aqueous solution of NaOH having a concentration of 48 wt.% was obtained from the evaporator of the No. 1 unit concentration process.

On the other hand, the dilute aqueous solution of NaCl obtained from the anode compartment of the electrolytic cell (the concentration of NaCl of 20 wt.%; 100° C.) was passed consecutively through the No. 1, No. 2 and No. 3 concentration units. The dilute aqueous solution of NaCl discharged from the heat exchanger of the No. 3 unit concentration process is saturated with the raw material of NaCl and the saturated solution is recycled to the anode compartment.

The temperatures of the aqueous solutions of NaOH and the dilute aqueous solutions of NaCl and the concentrations of the aqueous solution of NaOH and the pressures in the No. 1, No. 2 and No. 3 evaporators in the No. 1, No. 2 and No. 3 concentration processes units are shown in Table 1.

The No. 1, No. 2 and No. 3 evaporators were made of nickel. The No. 1, No. 2 and No. 3 heat exchangers each had titanium-nickel composite partitions.

Table 1

|  | No. 1 unit conc. process | No. 2 unit conc. process | No. 3 unit conc. process |
| --- | --- | --- | --- |
| Concentration of aq. sol. of NaOH (wt. %) | 36.8 | 43.0 | 50.0 |
| Temp. of aq. sol. of NaOH (° C) | 65.5 | 72.5 | 80.0 |
| Temp. of aq. sol. of NaCl (° C) | 75.0 | 82 | 87 |
| Pressure in evaporator (mmHg. ab.) | 61.5 | 61.5 | 61.5 |

EXAMPLE 2

In accordance with the process of Example 1 except using a concentration apparatus connecting five concentration processes units of FIG. 1 in series, the aqueous solution of NaOH was concentrated under the heat exchange with the dilute aqueous solution of NaCl to obtain a concentrated aqueous solution of NaOH having a concentration of 50 wt.%. The concentrations of the aqueous solutions of NaOH and the temperatures of the aqueous solutions of NaOH and the dilute aqueous solutions of NaCl and the pressures of the evaporators in the concentration processes units are shown in Table 2.

Table 2

|  | No.1 unit conc. process | No.2 unit conc. process | No.3 unit conc. process | No.4 unit conc. process | No.5 unit conc. process |
| --- | --- | --- | --- | --- | --- |
| Concentration of aq. sol. of NaOH (wt. %) | 33.8 | 37.6 | 41.2 | 44.7 | 50.0 |
| Temp. of aq. sol. of NaOH (° C.) | 62 | 66 | 71 | 75 | 80 |
| Temp. of aq. sol. of NaCl (° C.) | 72 | 76 | 79 | 83 | 86 |
| Pressure in evaporator (mmHg.ab.) | 61.5 | 61.5 | 61.5 | 61.5 | 61.5 |

EXAMPLE 3

An inner tube made of titanium (length of 1000 mm; inner diameter of 15 mm; thickness of 3 mm) was inserted into an outer tube made of titanium (length of 800 mm; inner diameter of 40 mm; thickness of 2 mm) to form a heat exchanger structure. The inner surface was galvanized with nickel to form a nickel layer having a thickness of $30\mu$. This was heated at 900° C. for 3 minutes in a vacuum electric furnace ($1 \times 10^{-3}$ torr.). The treated inner tube was cut and the sectional surface was observed by an electron microscope. A nickel-titanium alloy layer (nickel 20%; titanium 80%) having a thickness of $5\mu$ was found between the titanium layer and the nickel layer having a thickness of $25\mu$.

An aqueous solution of NaOH having a concentration of NaOH of 50 wt.% at 80° C. was fed to the inner tube of the heat exchanger at a rate of 1 m³/hr. and an anolyte having a concentration of NaCl of 15 wt.% obtained by a diaphragm type electrolysis of aqueous solution of NaCl at 95° C. was fed to the annular part between the inner tube and the outer tube at a rate of 5 m³/hr. in recycle. The heat exchange was continued for 8600 hr. Then, the inner tube was disassembled and the inner and outer surfaces of the inner tube was observed. No corrosion was found.

EXAMPLES 4 and 5

In accordance with the process of Example 3, except forming nickel layer and nickel-titanium layer which had various thicknesses by varying the condition in the inner tube, the heat exchange was carried out by feeding the aqueous solution of NaOH and the aqueous solution of NaCl and the corrosion of the inner tube was observed. The results are shown in Table 3.

Table 3

|  | Example 4 | Example 5 |
| --- | --- | --- |
| Thickness of Ni layer ($\mu$) | 20 | 50 |
| Condition of heating (° C.: min.) | 800° C. 30 min. | 1000° C. 30 min. |
| Thickness of Ni-Ti alloy layer ($\mu$) | 2 | 15 |
| Thickness of Ni layer after heat treatment ($\mu$) | 18 | 35 |
| Corrosion | none | none |

What is claimed is:

1. In a process for producing a concentrated aqueous caustic alkali solution by:

(a) electrolyzing an aqueous solution of an alkali metal chloride in an electrolysis cell divided by a membrane into an anode compartment and a cathode compartment, whereby a dilute aqueous caustic alkali solution is generated in said cathode compartment and a dilute alkali metal chloride solution which has been heated by the passage of electric current is generated in said anode compartment, and (b) removing said dilute aqueous caustic solution from said cathode compartment and concentrating it by evaporation of water therefrom, the improvement comprising:

subjecting said dilute caustic alkali solution to a plurality of concentrating operations each comprising the steps of heating said dilute caustic alkali solution by heat exchange with said electrically heated dilute alkali metal chloride solution and removing water vapor from said heated dilute caustic alkali solution, whereby an enriched caustic alkali solution is produced, wherein said dilute alkali metal chloride solution and said caustic alkali solution are passed countercurrently through the heat exchange steps of said concentrating operations and said dilute alkali metal chloride solution is recycled to the anode compartment of said electrolysis cell.

2. The process of claim 1, wherein said dilute alkali metal chloride solution, after passing through the heat exchange steps of the concentration operations, has its concentration of alkali metal chloride increased and is then recycled to the anode compartment of said electrolysis cell.

3. The process of claim 2, wherein said heat exchange step is performed in a heat exchanger having adjacent compartments separated by a partition comprised of a titanium-alkali resistant metal laminate having a titanium side and an alkali resistant metal side wherein the aqueous alkali metal chloride solution is contacted with the titanium side of the partition and the aqueous caustic alkali solution is contacted with the alkali resistant metal side of the partition whereby the heat exchange takes place by conduction through the partition.

4. The process of claim 3, wherein said titanium-alkali-resistant metal laminate is prepared by bonding a titanium layer to a layer of alkali resistant metal.

5. The process of claim 3, wherein said alkali resistant metal is selected from the group consisting of nickel, nickel alloys, iron and iron alloys.

6. The process of claim 3, wherein said titanium-alkali-resistant metal laminate is prepared by contacting a titanium layer with a nickel layer and heating the assembly at a temperature higher than 450° C. in a non-oxidizing atmosphere to bond the titanium and nickel layers together.

7. The process of claim 2, wherein the concentration of the alkali metal chloride solution is increased by adding thereto an alkali metal chloride salt, and the resulting solution is purified before being recycled to the anode compartment of the electrolysis cell.

8. The process of claim 1, wherein a portion of the enriched caustic alkali solution is recycled in said concentration operation.

9. The process of claim 8, wherein the water vapor is removed from said dilute caustic alkali solution at subatmospheric pressure which is the same in each concentration operation.

10. The process of claim 1, wherein three to five concentrating operations are performed.

* * * * *